United States Patent [19]

Matros et al.

[11] Patent Number: 4,478,808

[45] Date of Patent: Oct. 23, 1984

[54] METHOD OF PRODUCING SULPHUR TRIOXIDE

[75] Inventors: Jury S. Matros; Georgy K. Boreskov; Viktor S. Lakhmostov, all of Novosibirsk; Viktor J. Volkov, Odessa; Alexei A. Ivanov, Novosibirsk, all of U.S.S.R.

[73] Assignee: Institut Kataliza Sibirskogo Otdelenia Akademii Nauk SSSR, U.S.S.R.

[21] Appl. No.: 336,371

[22] PCT Filed: May 5, 1980

[86] PCT No.: PCT/SU80/00071

§ 371 Date: Dec. 24, 1981

§ 102(e) Date: Dec. 24, 1981

[87] PCT Pub. No.: WO81/03166

PCT Pub. Date: Nov. 12, 1981

[51] Int. Cl.³ .................. C01B 17/14; C01B 17/98; C01B 17/48

[52] U.S. Cl. .................................. 423/522; 423/533; 423/DIG. 6; 422/160

[58] Field of Search ......... 423/522, 533, 535, DIG. 6; 422/160

[56] References Cited

U.S. PATENT DOCUMENTS 3,856,927 12/1974 Silveston et al. ................ 423/533

FOREIGN PATENT DOCUMENTS 975927 10/1979 Canada ............................. 423/522

Primary Examiner—Gary P. Straub
Attorney, Agent, or Firm—Steinberg & Raskin

[57] ABSTRACT

A method of preparing sulphur trioxide by the oxidation of sulphur dioxide contained in a reaction mixture in a stationary catalyst bed wherein the direction of the movement of the reaction mixture flow along the catalyst bed is reversed periodically each 10-200 minutes, or the temperature of said reaction mixture is changed in front of the catalyst bed from a temperature of 20°-200° C. to a temperature of 350°-600° C. each 10-200 minutes.

3 Claims, 4 Drawing Figures

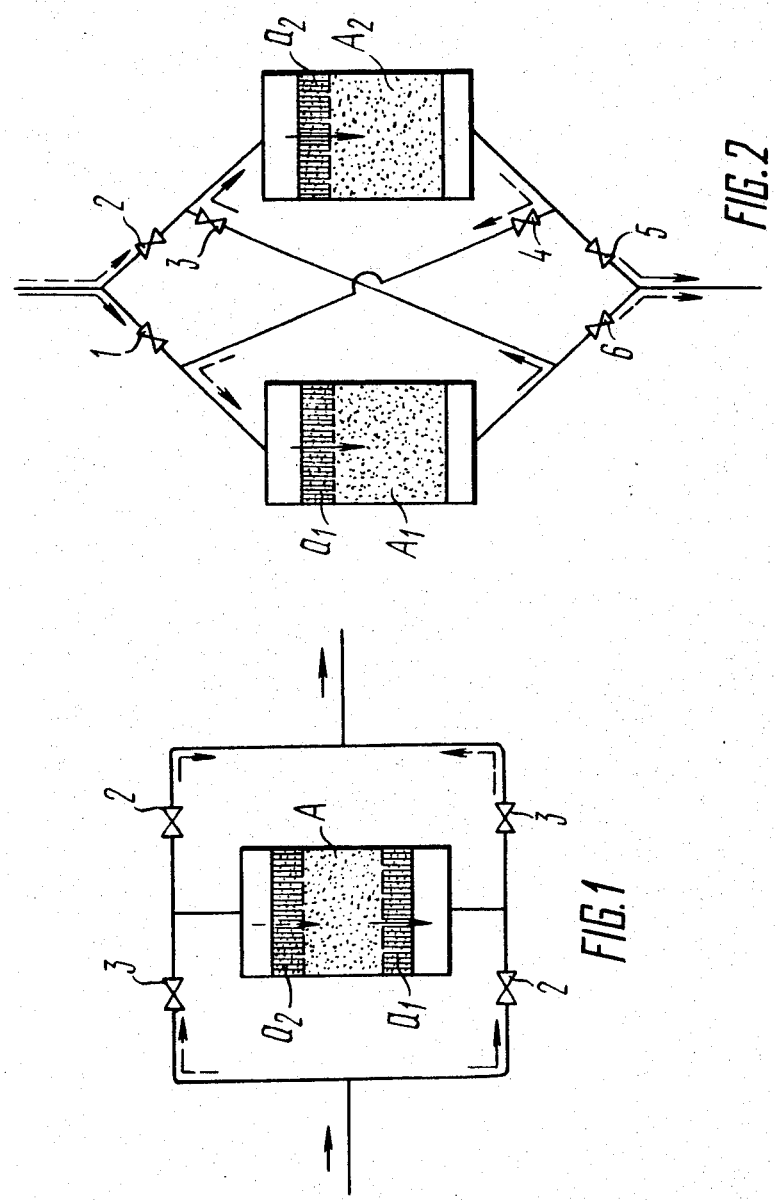

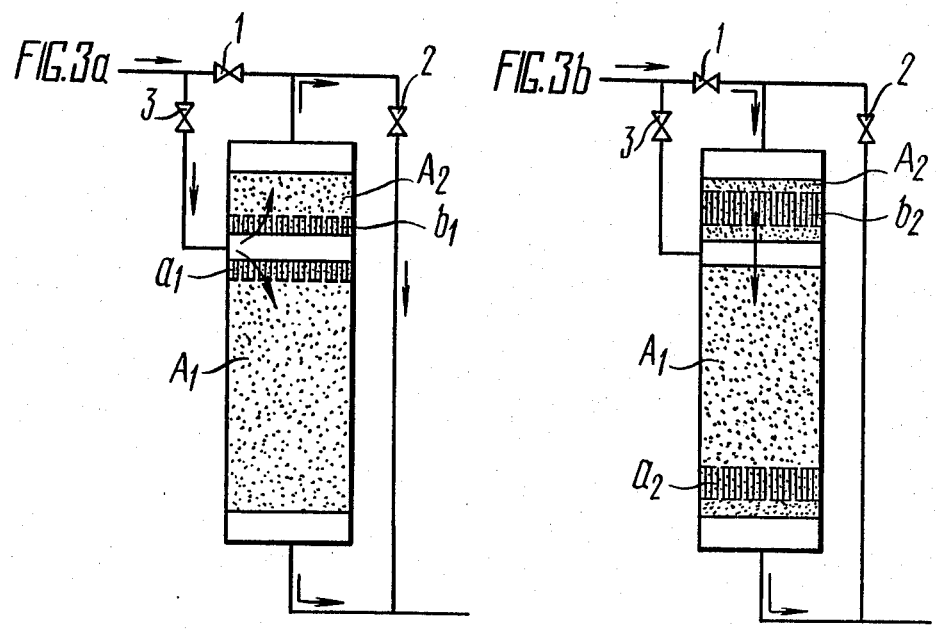

METHOD OF PRODUCING SULPHUR TRIOXIDE

TECHNICAL FIELD

The present invention relates to the processing of sulphurous gases and more particularly to a method of producing sulphur trioxide.

Known in the art are methods of producing sulphur trioxide by oxidation of sulphur dioxide with subsequent production of sulphuric acid. These methods are performed in contact apparatus with several (most frequently with 4 or 5) adiabatic beds of a catalyst and with built-in or separate heat-exchangers between the beds. The initial gas enters the contact apparatus at a temperature of 20°–100° C. and is heated in the heat-exchangers by the reacted gas up to the temperature of the commencement of the reaction on the first catalyst bed, which is equal to 390°–440° C. The most intensive oxidation takes place on the first bed where the degree of conversion reaches 0.7–0.8 and the gas leaving the catalyst has a temperature of about 600° C. The temperature conditions in the apparatus on all catalyst beds is kept constant. Known methods are used for oxidizing gases with a sulphur dioxide content of 7.5–12 vol.%, these gases being obtained either by burning elemental sulphur or by roasting sulphur-containing ores. ("Spravochnik sernokislotchika" published in 1971, "Khimiya" Moscow, p. 481).

Implementation of such known methods requires complex contact apparatus. The known methods also make possible the production of sulphur trioxide from waste gases, for instance, in non-ferrous metallurgy, with a sulphur dioxide content therein of 3.5–7.0 vol.%, the surface area of heat-exchangers in contact apparatus being considerably increased.

For the oxidation of gases with a sulphur dioxide content of less than 3.5 vol.% constant heat supply is required, for which purpose residual oil or natural gas is used as a fuel.

Gases with a sulphur dioxide content of less than 2.0–2.5 vol.% are generally not processed, since the process becomes uneconomical and the gases are discharged into the atmosphere, thus contaminating and poisoning the environment.

Gases containing more than 12 vol.% of sulphur dioxide are not processed on conventional catalysts because of high and prolonged overheating of the catalyst in the reaction zone (above 650° C.).

It is practically impossible to process by the known methods, without recourse to special measures, waste gases with a variable content of sulphur dioxide in non-ferrous metallurgy when the content varies during short periods of time. It follows from the above that the known methods are technologically complicated and do not allow the processing of gases with low, variable, and high content of sulphur dioxide within a wide range of concentrations both constant and variable with time.

Disclosure of the Invention

It is an object of the invention to provide a method of producing sulphur trioxide which have high technical and economic characteristics and make it possible to process gases having a composition which is either constant or varying with time with a sulphur dioxide content of 0.6 to 15.0 vol.%.

This object is accomplished in a method of producing sulphur trioxide by oxidation of sulphur dioxide in a stationary catalyst bed; in said method, according to the invention, the process is performed with a periodic (every 10–200 minutes) reversal of the direction of the flow of the reaction mixture, containing sulphur dioxide and moving along the catalyst bed, with or a change of the reaction mixture temperature just before entering the catalyst bed from 20°–200° to 350°–600° C. during 10–200 minutes.

Implementation of the process under the above-cited conditions allows the use of simple and cheap contact apparatus of enhanced reliability and decrease of their metal capacity 10–20 times as compared with the known ones. In addition, it becomes possible to process gases with a sulphur dioxide content in a wide range of concentrations, both constant and varying with time. Thus, for instance, gases containing 0.6–2.5 vol.% of sulphur dioxide, ususally discharged into the atmosphere, can be processed without additional heat supply. It is expedient to carry out such method of oxidation at any low initial temperatures when the sulphur dioxide content in the reaction mixture varies with time from 0.6 to 5% or from 2 to 9 vol.%.

Throughout this application the term "initial reaction mixture" is used to denote the gas at the input of the contant apparatus and at the input to the reaction zone, including the unreacted sulphur dioxide; the term "reaction mixture" is used to denote gases containing both sulphur dioxide and sulphur trioxide, residing in the regions of the beginning and end of the chemical reaction; the term "unreacted reaction mixture" is used to denote gases at the outlet of the reaction zone and contact apparatus and containing, predominantly, sulphur trioxide.

Best Mode for Carrying Out the Invention

The method is preferably accomplished in the following way. An initial reaction mixture with a sulphur dioxide content of 1.0 or 10 vol.% is fed at 20° C. onto the catalyst heated up to 500° C. The temperature of the mixture rises because of direct contact with the catalyst and at 390° C. the oxidation reaction begins. The part of the catalyst located at the input of the initial reaction mixture is cooled down to the temperature of the mixture, thus playing the role of a regenerative heat-exchanger. As a result of such mechanism of heat transfer along the catalyst bed, a moving heat front (reaction zone) is formed whose temperature profile is determined by the initial concentration of sulphur dioxide and other parameters.

In order to keep the moving heat front of the reaction within the catalyst bed, it is necessary to reverse periodically the direction of the movement of the initial reaction mixture during, say, 60 minutes. The cooling of that part of the catalyst which is adjacent to the input of the initial reaction mixture and the heat front reverses its direction. Appropriate choice of a number of technological parameters (linear velocity, switching-over time, etc.) eliminates prolonged overheating of the catalyst when gases with a high content of sulphur dioxide (up to 15 vol.%) are processed and ensures an intensive course of the chemical reaction when processing gases with the sulphur dioxide content as low as 0.6 to 2.5 vol.%.

The proposed method avoids the use of heat-exchangers or additional heat sources for heating the initial reaction mixture since the catalyst bed itself acts as regenerative heat-exchangers, heating the initial reaction mixture and cooling the reacted mixture. The temperature regime close to a theoretical one is established thus ensuring a high degree of sulphur dioxide conversion into trioxide in one catalyst bed.

The second variant of realizing the method can be performed in a catalyst bed when the temperature of the initial reaction mixture periodically changes from 20°–200° to 390°–600° C. If the initial reaction mixture entering the catalyst bed has a high temperature (for instance, 420° C.), the temperature profile is formed at the initial part of the catalyst bed where the chemical transformation takes place. A decrease of the temperature of the initial mixture to minimum values (for instance, 20° C.) cools down the catalyst adjacent to the input. A heat front is formed in the bed which moves to the output and chemical transformation takes place in this front. At the instant when the heat front is close to the output of the reaction mixture from the catalyst bed, the temperature of the initial reaction mixture is raised again up to maximum and the region of high temperatures is formed on the initial part of the catalyst bed where chemical transformation takes place. Then the initial temperature is lowered again and in the catalyst bed a heat front re-appears instead of that which has just left the bed. Such method of oxidizing sulphur dioxide in the catalyst bed favours the formation of the temperature profile close, on the average, to theoretical thus ensuring the degree of conversion of sulphur dioxide into trioxide up to 0.98 in one catalyst bed.

Principle schemes of realizing the proposed method, presented in FIGS. 1, 2 and 3, are given hereinbelow by way of illustration.

FIG. 1 shows the scheme of oxidation of the initial reaction mixture in one catalyst bed. The initial reaction mixture with a sulphur dioxide content 3.5 vol.% is fed at 20° C. on the catalyst A pre-heated up to 500° C.; the direction of the delivery is shown by solid arrows. In this case gates 2 are opened and valves 3 are closed. Direct contact with the catalyst raises the temperature of the initial reaction mixture up to 390° C., which corresponds to the temperature of the beginning of the reaction. As a result, a heat front $a_1$ forms along the catalyst bed; in 60 minutes said front occupies the position $a_2$. Ahead of the heat front, which moves in the direction of filtration, a zone of the catalyst appears cooled to a temperature of the initial reaction mixture (20° C.). In 60 minutes valves 2 and 3 are switched over simultaneously and the initial reaction mixture reverses the direction of its movement (dashed arrows). The reaction front $a_2$ moves in an opposite direction and in 60 minutes occupies the position $a_1$. After this a complete cycle equal to 120 minutes is repeated which provides a continuous output of the reacted reaction mixture from the catalyst bed.

It is seen from FIG. 1 that, upon moving the heat front "a" between positions $a_1$ and $a_2$, there are catalyst zones ahead and behind the front which do not participate in the chemical reaction but play the role of regenerative heat-exchangers heating the initial reaction mixture with a temperature 20° C. to the temperature corresponding to the beginning of the reaction and cooling the reacted reaction mixture at the expense of transfer of the reaction heat to the catalyst cooled to 20° C.

FIG. 2 illustrates the oxidation scheme which is realized when the temperature of the reaction mixture changes from 20°–200° to 390°–600° C. for 10–200 minutes. The initial reaction mixture is fed into the catalyst bed in one direction. In the catalyst divided into two equal parts $A_1$ and $A_2$ the heat front of the reaction periodically moves from position $a_1$ to $a_2$ and then according to the scheme $a_2$-$a_1$-$a_2$-$a_1$-$a_2$-$a_1$ etc. The movement of the heat front is performed by alternating switch over of the valves 1–6. The reacted reaction mixture is removed from the catalyst bed in the direction pointed by the arrows. For instance, the initial reaction mixture with a sulphur dioxide content of 9 vol.% and a temperature of 70° C. is delivered to the catalyst $A_1$ pre-heated to 500° C. in the direction indicated by solid arrows. The heat front thus arising begins to move from the position $a_1$ to $a_2$. The gates 1, 3 and 5 are opened whereas 2, 4 and 6 are closed. In 100 minutes (duration of semi-cycle) the reaction mixture with a temperature of 500° C. passes into a non-heated part $A_2$ of the bed. At this instant the 1, 3 gates are closed, the gate 2 is opened and the initial reaction mixture with a temperature of 70° C. is fed into the part $A_2$ of the catalyst bed. When the gates 1, 3 are completely closed and gate 2 is completely opened, the gates 4, 5 and 6 begin to operate simultaneously. The gate 5 is closed and gates 4, 6 are opened; the reacted reaction mixture from the part $A_2$ of the bed is fed into part $A_1$ and removed from the catalyst (dashed arrows). When the heat front passes from the position $a_1$ to the position $a_2$ and vice versa both in upper and low zones of the parts $A_1$ and $A_2$, the temperature in the zones rises from 70° C. to maximun 600° C. and lowers from 600° C. to 70° C. The mechanism of the movement of the heat front along the catalyst bed with an alternating formation of hot and cold zones of the catalyst, which play the role of heat-exchangers, is similar to that shown in FIG. 1. The successive switching over of the gates 1–6 ensures a continuous movement of the heat front according to the scheme $a_1$-$a_2$-$a_1$-$a_2$ and so on in one direction and, consequently, a continuous removal of the reacted reaction mixture from the catalyst bed.

FIG. 3 illustrates one more scheme of oxidation which is also realized by changing the temperature of the mixture from 20°–200° to 390°–600° C. during 10–200 minutes. The initial reaction mixture is fed into a catalyst bed, divided into two unequal parts $A_1$ and $A_2$, periodically in two directions. The part $A_2$ of the bed serves as a "primer" of the main bed $A_1$; the temperature of the mixture entering the part $A_2$ is periodically changed. For instance, an initial reaction mixture with a sulphur dioxide content 0.6 vol.% at a temperature of 200° C. is fed on the catalyst $A_1$ and $A_2$ pre-heated up to 500° C. in the direction shown by the arrows (FIG. 3a). In each part $A_1$ and $A_2$ two heat fronts arise ($a_1$ and $b_1$) which begin to move in opposite directions. The gate 1 is closed and the gate 3 is opened; the gate 2 is opened incompletely thus controlling a slow movement of the heat front $b_1$ with respect to the movement of $a_1$. In 60 minutes the heat fronts occupy positions $a_2$ and $b_2$ (FIG. 3b) after which the gates 2 and 3 are closed and the gate 1 is opened and the initial reaction mixture is delivered in the direction shown by the arrows. Sulphur dioxide contained in the initial reaction mixture oxidizes in the reaction zone $b_2$. Since no sulphur dioxide enters zone $a_2$, the reaction in said zone does not take place and the heat front $a_2$ removes from the bed. In 10 minutes the heat front $b_2$ occupies the position shown in FIG. 3a and splits into two heat fronts $a_1$ and $b_1$. In this position the gates 1, 2 and 3 are switched over and the cycle, whose duration is 70 minutes, repeats. In front of the part $A_1$ of the catalyst bed, where the mixture enters the catalyst, the temperature of the catalyst is periodically (each 70 minutes) changed from 200° to 390°–600° C.

Successive switching over of the gates 1, 2 and 3 provides a pulse arising and damping of the heat front $a_1$ which ensures a continuous removal of the reacted reaction mixture from the catalyst bed. The part $A_2$ of the catalyst periodically acts as a "primer".

EXAMPLE 1

An initial reaction mixture formed during combustion of sulphur and consisting of 10.5 vol.% of sulphur dioxide, 10.5 vol.% of oxygen, and 79 vol.% of nitrogen is fed into a contact apparatus with one adiabatic catalyst bed (FIG. 1). The composition of the catalyst is as follows (wt.%):

$V_2O_5$: 6–9
$K_2O$: 10–16
$SO_3$: 8–12
Support $SiO_2$: the balance.

The temperature of the initial reaction mixture is 20° C.; the conditional contact time about 6 sec. Prior to introduction of the initial reaction mixture, the bed is heated to 500° C.

In this example the direction of movement of the reaction mixture flow (FIG. 1) is reversed by interchanging the input and output of the mixture in 40 minutes. In the next 40 minutes the direction of movement of the initial reaction mixture is reversed again, and so on. Duration of each cycle is 80 minutes. An average degree of sulphur dioxide conversion into trioxide is 98.3% per cycle which is equivalent to operation in stationary regime of a contact apparatus with five adiabatic catalyst beds with intermediate heat-exchangers.

EXAMPLE 2

An initial reaction mixture formed during calcination of pyrite and consisting of 7.5 vol.% of sulphur dioxide, 10.5 vol.% of oxygen, and 82 vol.% of nitrogen is delivered into a contact apparatus with one adiabatic catalyst bed (FIG. 1). The composition of the catalyst is similar to that described in Example 1. The temperature of the initial reaction mixture is 150° C.; the conditional contact time is 5 sec. Prior to introduction of the initial reaction mixture, the bed is heated up to 550° C. The direction of movement of the reaction mixture is reversed each 55 minutes; a cycle duration is 110 minutes. The degree of sulphur dioxide conversion into trioxide is 98.5% per cycle.

EXAMPLE 3

An initial reaction mixture formed during combustion of sulphur and consisting of 12 vol.% of sulphur dioxide, 11 vol.% of oxygen, and 78 vol.% of nitrogen is delivered into a contact apparatus with one adiabatic catalyst bed (FIG. 1). The composition of the catalyst is similar to that described in Example 1. The temperature of the initial reaction mixture is 20° C.; the conditional contact time is about 6 sec. Prior to introduction of the initial reaction mixture, the catalyst bed is heated up to 500° C. Each 30 minutes the direction of the movement of the reaction mixture is reversed; cycle duration is 60 minutes. An average degree of sulphur dioxide conversion into trioxide is 98.1% per cycle.

EXAMPLE 4

The procedure is similar to that described in Example 1. Conditional contact time is 7 sec; cycle duration 200 minutes. An average conversion degree is 98.0% per cycle.

EXAMPLE 5

The procedure is similar to that described in Example 1. The conditional contact time is 5 sec; cycle duration 10 minutes. An average conversion degree is 98.5% per cycle.

EXAMPLE 6

The procedure is similar to that described in Example 1. The composition of the initial reaction mixture is 0.6 vol.% of sulphur dioxide, 5 vol.% of oxygen, and 94.4 vol.% of nitrogen, said mixture being fed into a contact apparatus with one catalyst bed. Cycle duration is 60 minutes; an average conversion degree is 99.3% per cycle.

EXAMPLE 7

The initial reaction mixture and the catalyst are similar to those described in Example 1. The catalyst bed is divided into two equal parts; the mode of the catalyst action is presented in description of FIG. 2. In this example the temperature of the reaction mixture is changed in front of the catalyst bed and its parts $A_1$ and $A_2$ (FIG. 2). The total amount of the catalyst in both parts corresponds to a conditional contact time 8 sec. The part $A_1$ of the bed is pre-heated up to 500° C. The temperature of the initial reaction mixture at the input of part $A_1$ is 20° C. The reaction mixture, after passing through parts $A_1$ and $A_2$, leaves the latter and the apparatus at a temperature which changes smoothly from 20° to 350° C. during 55 minutes (semi-cycle); then the gates are switched over in the succession given in the description of FIG. 2. In 35 minutes after the beginning of the cycle the temperature of the reaction mixture at the input to the upper part $A_2$ of the bed attains 250° C., in the next 10 minutes it attains 280° C., and in another 10 minutes —320° C.; towards the end of semi-cycle (55 minutes) the temperature attains 350° C. After switching over the gates in 55 minutes the initial reaction mixture is fed to the part $A_2$ of the bed in the direction shown by dashed arrows. In the next 55 minutes the heat front from the position $a_2$ passes completely into the position $a_1$ and the cycle with a duration 110 minutes is repeated. An average conversion degree is 98.4% per cycle which is equivalent to the operation of a contact apparatus with five successively located catalyst beds and intermediate heat-exchangers.

EXAMPLE 8

The initial data are similar to those given in Examples 7 and 1. The difference consists in that switching over of the gates in 55 minutes and re-distribution of the entering initial reaction mixture between the catalyst parts $A_1$ and $A_2$ (see FIG. 2) are performed when heat fronts $a_1$ and $a_2$ are successively placed in the middle of the parts $A_1$ and $A_2$. The succession of switching over the gates is the same as in the description of FIG. 2. A semi-cycle (55 minutes) begins when the heat front $a_1$ occupies the position in the middle of $A_1$ and the initial reaction mixture at a temperature of 20° C. is fed in the direction shown by solid arrows (FIG. 2). The heat front passes through the upper part $A_2$ of the bed with the same temperatures as those described in Example 7 and in 55 minutes it occupies the position $a_2$ in the middle of $A_2$. The gates are switched over and the initial reaction mixture at 20° C. is delivered into the upper part $A_2$ of the bed in the direction shown by dashed arrows (FIG. 2). In the next 55 minutes, i.e. in 110 minutes of the complete cycle, the heat front a₂ occupies the position a₁ (in the middle of A₁) and the cycle is repeated. During each semi-cycle the reacted reaction mixture is removed successively from the parts A₁ and A₂ of the bed and from the apparatus, the temperature of said mixture being smoothly changed from 20° to 350° C.

EXAMPLE 9

The example is similar to Example 7. The initial reaction mixture consisting of 0.6 vol.% of sulphur dioxide, 15 vol.% of oxygen and 84 vol.% of nitrogen is successively delivered to the parts A₁ and A₂ of the bed (FIG. 2) at a temperature of 200° C. Cycle duration is 75 minutes. From cycle to cycle the temperature changes smoothly from 200° to 600° C. and lowers down to 200° C. at the inputs of the mixture into the parts A₁ and A₂. An average conversion degree is 99.4% per cycle.

EXAMPLE 10

The Example is similar to Example 7. The reaction mixture with a sulphur dioxide content varying in time from 0.6 to 7 vol.% and oxygen content 9–10 vol.% is successively delivered to the parts A₁ and A₂ of the catalyst bed (FIG. 2) at 100° C. Cycle duration is 80 minutes. An average conversion degree is 98.7% per cycle.

EXAMPLE 11

An initial reaction mixture formed during combustion of sulphur and consisting of 12 vol.% of sulphur dioxide, 9 vol.% of oxygen, and 79 vol.% of nitrogen is fed into a contact apparatus with a "primer" as is shown in FIG. 3. The catalyst is pre-heated to 500° C., conditional contact time 9 sec. The temperature of the initial reaction mixture is 20° C. The initial reaction mixture is delivered both to the part A₁ and A₂ (FIG. 3a) for 170 minutes after which the heat fronts a₁ and b₁ occupy the positions a₂ and b₂. During the next 30 minutes the initial reaction mixture is fed into the bed A₁ through a "primer" A₂ as is shown in FIG. 3b. During this period of time the heat front b₂ occupies the position a₁ and b₁ whereas the heat front a₂ is removed from the part A₁. When the heat front b₂ is split, in the upper part of the bed A₁ and in the lower part of the bed A₂ the temperature at the moment of switching over of the gate is 20° C., in the next 15 minutes −180° C., in 5 minutes −350° C., and in 30 minutes −600° C. At this moment the gates are switched over again in the same succession which is given in the description of FIG. 3. The initial reaction mixture is fed at 20° C. into a layer between the parts A₁ and A₂ of the catalyst bed. The system occupies the position shown in FIG. 3a which corresponds to the cycle duration 200 minutes. An average conversion degree is 98.1% per cycle which is equivalent to the operation of a contact apparatus with five adiabatic catalyst beds and with intermediate heat-exchangers.

EXAMPLE 12

The Example is similar to Example 11. The initial reaction mixture is delivered on the catalyst at 200° C. Cycle duration is 150 minutes. An average conversion degree is 98.2%.

EXAMPLE 13

The Example is similar to Example 11. The initial reaction mixture containing 1.5 vol.% of sulphur dioxide, 15 vol.% of oxygen, and 83.5 vol.% of nitrogen are processed at a cycle duration of 130 minutes. An average conversion degree is 99.3% per cycle.

EXAMPLE 14

An initial reaction mixture formed upon combustion of sulphur and containing 15 vol.% of sulphur dioxide, 11 vol.% of oxygen, and 74% of nitrogen is fed into a contact apparatus with one catalyst bed. Any scheme shown in FIGS. 1, 2 and 3 can be realized. The temperature of the initial reaction mixture at first stage is 50° C.; conditional contact time—5 sec. Prior to introduction of the initial reaction mixture, the catalyst bed is preheated to 500° C. An average degree of sulphur dioxide conversion into trioxide at this stage is 94%, cycle duration 110 minutes. Such conversion degree is relatively low and additional oxidation of the non-oxidized sulphur dioxide is required. For this purpose, the reaction mixture obtained is delivered to the first absorption stage after which the reaction mixture containing 0.75 vol.% of sulphur dioxide, 3.6 vol.% of oxygen, and nitrogen—the balance is fed into the second catalyst bed at 60° C. and conditional contact time 5 sec. Said second catalyst bed is the second stage of contacting. There the reaction mixture is oxidized up to a high conversion degree (99.8%), the duration of the cycle being 80 minutes. The scheme of the contact apparatus may be similar to that chosen for the first stage or be any one of those shown in FIGS. 1, 2 or 3. The catalyst for the first and second stage is similar to that used in Example 1.

EXAMPLE 15

An initial reaction mixture formed upon burning sulphur in oxygen saturated air and consisting of 15 vol.% of sulphur dioxide, 12 vol.% of oxygen, and 73 vol.% of nitrogen is fed to the first stage of contacting. The rest conditions are similar to those described in Example 14. After the first stage the conversion degree is 94.2% and the duration of the cycle 160 minutes. The reaction mixture after the first absorption stage goes to the second stage of contacting with a sulphur dioxide content 0.886 vol.%, 4.07 vol.% of oxygen, and nitrogen—the balance. Cycle duration is 80 minutes; the total conversion degree 99.87%.

EXAMPLE 16

The Example is similar to Example 1. The difference consists in that a sulphur dioxide content in the reaction mixture changes with time at random from 0.6 to 5%, whereas an oxygen content remains almost constant and equals 9%. Cycle duration is 80 minutes, an average conversion degree 98.6%.

EXAMPLE 17

The Example is similar to Example 7. The difference consists in that a sulphur dioxide content in the initial reaction mixture changes with time from 2 to 9 vol.% whereas an oxygen content remains almost constant and equals 12 vol.%. Cycle duration is 90 minutes; an average conversion degree 98.2%.

EXAMPLE 18

The Example is similar to Example 14. The difference resides in that sulphur dioxide content is 11.5% oxygen content is 9.5%, and nitrogen is the balance. The conversion degree of sulphur dioxide at first stage of contacting is 94.6%; after second stage the conversion degree is 99.9%.

Industrial Applicability

The proposed invention may find application in the manufacture of sulphuric acid.

What is claimed is:

1. Method of producing sulphur trioxide by the oxidation in a stationary catalyst bed of sulphur dioxide contained in a reaction mixture, which comprises passing a reaction mixture containing sulphur dioxide in a concentration which varies between 0.6–15.0 vol % through a stationary catalyst bed having two ends, said catalyst bed catalyzing the oxidation of sulphur dioxide to sulphur trioxide and acting as a regenerative heat exchanger, said reaction mixture being passed at a temperature of 20°–200° C. through one end of said catalyst bed which is at a temperature of 350°–600° C., the temperature of said reaction mixture increasing as it passes through said catalyst bed to the other end of said catalyst bed to a temperature of 350°–600° C., and periodically during the time intervals of 10–200 minutes while the temperature of said catalyst bed at said one end is decreasing, reversing the direction of flow of said reaction mixture through said catalyst bed.

2. Method according to claim 1 wherein the content of sulphur dioxide in said reaction mixture varies from 0.6–5 vol %.

3. Method according to claim 1 wherein said content of sulphur dioxide in said reaction mixture varies between 2–9 vol %.

* * * * *